Dec. 26, 1939.  E. HODALY  2,184,872
ELECTRIC BLENDING VAPORIZER
Filed May 31, 1938
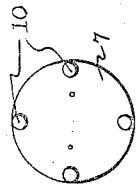
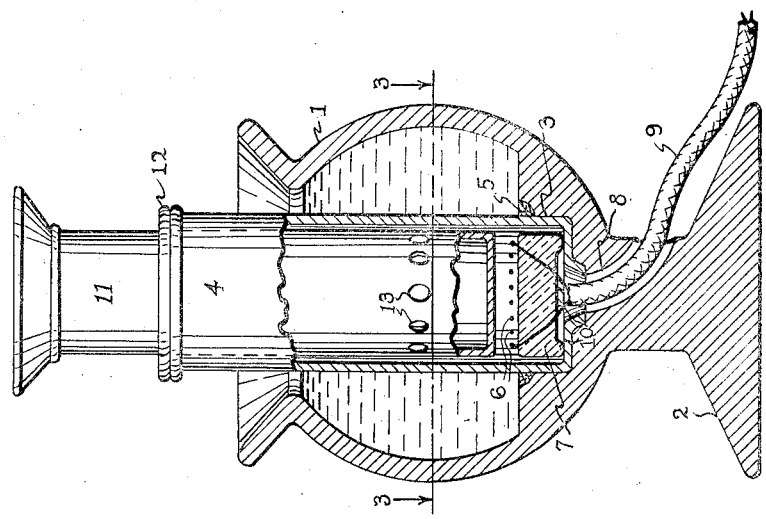
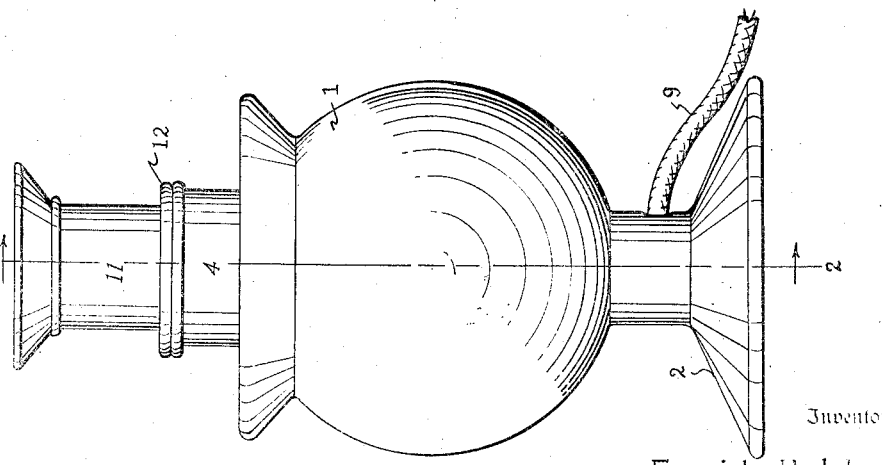
Inventor
Emerick Hodaly Patented Dec. 26, 1939

2,184,872

UNITED STATES PATENT OFFICE 2,184,872

ELECTRIC BLENDING VAPORIZER

Emerick Hodaly, Detroit, Mich.

Application May 31, 1938, Serial No. 210,841

9 Claims. (Cl. 219—38)

This invention relates to vaporizers and more particularly electrically heated vaporizers.

An object of the invention is to provide a vaporizer comprising two vessels considerably differing in capacity, and a heater adapted to heat the larger vessel and to more intensely heat the smaller one, whereby the latter serves for a rapid vaporization in small volume, and the larger vessel for a gradual vaporization in greater volume.

Another object is to provide a vaporizer in which a single heater is effective to heat two vessels from which different vapors may be diffused, securing different desired results or blending to secure a single desired result.

A further object is to provide an electrically heated vaporizer in which an upward stream of air induced by the heater will be delivered through a vessel receiving a liquid or solid to be vaporized, thus facilitating an upward discharge of vapor from such vessel.

A further object is to provide a vaporizer comprising a vessel receiving a liquid or solid to be vaporized, said vessel being readily removable from the vaporizer to permit of convenient cleaning or discharge of residue.

These and various other objects are attained by the construction hereinafter described and illustrated in the accompanying drawing, wherein:

Fig. 1 is a side elevational view of the improved vaporizer.

Fig. 2 is an axial vertical sectional view of the same.

Fig. 3 is a cross sectional view, taken upon the line 3—3 of Fig. 2.

Fig. 4 is a bottom view of an electric heater employed in the vaporizer.

In these views, the reference character 1 designates an open-topped vessel, preferably of circular cross section, which has a relatively thick bottom and is integrally formed with a base 2 serving to elevate the vessel slightly above a supporting surface. Centrally formed in the bottom, is an upwardly opening socket 3 in which is snugly fitted a tubular, open-topped, metallic receiver 4, which extends upwardly through said vessel and preferably projects slightly thereabove. Said receiver is liquid-sealed within said socket, as for example by a ring of cement or other packing material 5, set into a groove formed marginally of the socket in the bottom of the vessel. Freely resting upon the bottom of the receiver 4 is an electric heater, which as illustrated comprises a heating element 6 and a porcelain support 7 for such element. An opening in the bottom of the receiver 4 and a passage 8 cored in the base portion of the vessel 1, jointly provide for leading in a cord 9 for the delivery of current to the heater. Said opening and passage further serve for delivering air to the receiver 4, as hereinafter more fully appears, and it is preferred to provide small knobs or bosses 10 on the bottom of the porcelain support 7, to slightly elevate such support, so that such air may flow therebeneath and rise between the support and the wall of the receiver. Depending within the receiver 4 and spaced slightly from its wall, is a tubular open-topped vessel 11, the top portion of which projects slightly above the receiver and the bottom of which is slightly spaced above the heating element 6. To maintain this position, an annular collar or bead 12 exteriorly fixed or formed on said vessel seats freely but snugly upon the rim of the receiver 4. It is preferred to form the vessel 11 with a plurality of apertures 13, preferably in a circular series, such apertures being located a short distance above the bottom of said vessel.

In use of the described vaporizer, material to be vaporized is provided in either or both vessels 1 and 11, prior to energizing the heater. The vessel 1 is intended to receive only a liquid, while the vessel 11 may receive either a liquid or solid. The vessel 11 is subjected to relatively high heat and is intended to effect quite rapid vaporization, whereas the vessel 1 is more moderately heated and best suited to produce a prolonged and quite gradual vaporization. Usually the materials introduced in to the vessel 11 will be of a potent nature such as incense or strong perfume, so that a few drops, fragments or particles will effect the desired permeation of the adjacent atmosphere. For merely humidifying the atmosphere, or diffusing weak perfumes or other solutions, the vessel 1 is employed. In many cases it is desirable to use both vessels simultaneously, as when incense or perfume in the vessel 11 serves to counteract the odor of a disinfectant distilled from the vessel 1. By heating different materials in the two vessels, the resulting vapors may be blended to obtain a variety of pleasing aromas.

By providing for an upward flow of air through the vessel 11, the discharge and spread of vapors therefrom is expedited. Thus operation of the heater produced a convection upflow of air in the receiver 4, such air entering through the passage 8 and overlying opening in the receiver. Such air is baffled by the bead 12 from escape at the top of the receiver and hence enters the vessel 1 by way of the apertures 13, to serve the aforesaid purpose.

The invention is presented as including all such changes and modifications as come within the scope of the following claims.

What I claim is:

1. An electric vaporizer comprising an open-topped vessel for receiving a liquid to be vaporized, the bottom of such vessel being formed with an upwardly opening socket, a substantially imperforate receiver set into such socket, and upwardly extending beyond the maximum liquid level in the vessel, a heater occupying the lower portion of said receiver, an electrical connection to the heater extending through the bottom of the receiver and through a passage laterally opening in the base of the vessel, and means for establishing a seal between the receiver and said socket, preventing access of liquid to the bottom of the receiver.

2. An electric vaporizer comprising a vessel for receiving a liquid to be vaporized and having an opening at its top for the discharge of vapor, an open-topped, substantially imperforate receiver centrally disposed in said vessel and sealed against access of liquid thereto from the vessel, said receiver extending above the maximum intended liquid level in the vessel, an electric heater in the lower portion of said receiver, means for connecting said heater in an electrical circuit, and a second vessel depending into the receiver and supported thereon in close proximity to the heater, and having an opening at its top for the discharge of vapors.

3. An electric vaporizer as set forth in claim 2, the first-mentioned vessel being open-topped, and the second vessel and receiver extending centrally upward through the first mentioned vessel beyond its top opening, the bottom of the first-mentioned vessel being formed with a socket wherein the receiver is mounted.

4. An electric vaporizer comprising a vertically elongated, open-topped receiver having an air inlet in its bottom portion, an electric heater in the bottom portion of said receiver, and a vessel for receiving material to be vaporized, loosely fitting in said receiver and having a closed bottom in proximity to said heater, and formed in its lower portion with an aperture for admitting to said vessel air drawn by convection into the receiver through said air inlet, an upward passage for such air being formed in exterior proximity to the receiver.

5. In an electric vaporizer as set forth in claim 4, means baffling air rising in said passage to compel a delivery of such air through said aperture into the vessel.

6. In an electric vaporizer as set forth in claim 4, a common means for supporting said vessel on the receiver, and for baffling air rising in said passage to compel a delivery of such air through said aperture into the vessel.

7. In an electric vaporizer as set forth in claim 4, an exterior annular projection on the vessel seating it on the rim of the receiver and substantially preventing the upward discharge of air between the receiver and vessel.

8. An electric vaporizer comprising two vessels disposed one within the other for receiving different materials to be vaporized, the outer vessel having a relatively large capacity and the inner vessel extending below the normal liquid surface level in the outer one, and an electric heater, arranged within the outer vessel and substantially beneath the inner vessel and heating both vessels, and in a more favorable heat transfer relation to the inner vessel than to the materials-receiving space of the outer vessel.

9. An electric vaporizer comprising a vessel for receiving a liquid to be vaporized, and having an opening at its top for the discharge of vapor, an open-topped substantially imperforate receiver disposed in said vessel and extending above the maximum intended liquid level in the vessel, a second open-topped vessel carried by and within said receiver and disposed at least partially within the outer vessel and upwardly extending through said opening with clearance from its periphery, and an electric heater within said receiver for heating the contents of both vessels.

EMERICK HODALY.